(12) United States Patent
Feldman et al.

(10) Patent No.: US 11,270,432 B1
(45) Date of Patent: Mar. 8, 2022

(54) INSPECTION OF A THREE DIMENSIONAL STRUCTURE OF A SAMPLE USING A PHASE SHIFT MASK

(71) Applicant: Applied Materials Israel Ltd., Rehovot (IL)

(72) Inventors: Haim Feldman, Nof-Ayalon (IL); Yoav Shechtman, Haifa (IL)

(73) Assignees: Applied Materials Israel Ltd., Rehovot (IL); TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 30 days.

(21) Appl. No.: 17/001,194

(22) Filed: Aug. 24, 2020

(51) Int. Cl.
*G06T 7/00* (2017.01)
*G01N 21/95* (2006.01)
*G01B 11/24* (2006.01)

(52) U.S. Cl.
CPC .............. *G06T 7/001* (2013.01); *G01B 11/24* (2013.01); *G01N 21/95* (2013.01); *G06T 2207/10028* (2013.01)

(58) Field of Classification Search
CPC .......... G06T 7/001; G06T 2207/10028; G01B 11/24; G01N 21/95

USPC ..... 356/237.1–237.6, 239.1–239.8, 600–640
See application file for complete search history.

(56) References Cited

U.S. PATENT DOCUMENTS

2015/0035946 A1   2/2015   Piestun et al.
2016/0301915 A1   10/2016   Shechtman et al.

*Primary Examiner* — Tri T Ton
(74) *Attorney, Agent, or Firm* — Kilpatrick Townsend & Stockton LLP

(57) ABSTRACT

A method for inspecting a three dimensional structure of a microscopic scale of a sample, the method may include obtaining an image of the three dimensional structure; obtaining a reference image of a reference three dimensional structure, the reference three dimensional structure and the three dimensional structure are ideally identical to each other; wherein each one of the image and the reference image was generated using optics that includes a phase mask, wherein the phase mask virtually expands a depth of field of the optics by encoding depth information over a depth range that exceeds the depth of field; generating a difference image that represents a difference between the image and the reference image; determining, based on the difference image, whether there is at least one defect in the three dimensional structure; wherein when determining that there is the at least one defect then providing a depth of the at least one defect.

16 Claims, 4 Drawing Sheets

INSPECTION OF A THREE DIMENSIONAL STRUCTURE OF A SAMPLE USING A PHASE SHIFT MASK

BACKGROUND

Inspection systems such as high-end inspection systems have a depth of field of a few hundred of nanometers. When such inspection systems are required to inspect a three dimensional structure that has a height of more than one micron (for example a three dimensional (3D) NAND memory—also referred to as vertical NAND or VNAND), the inspection process involves a time consuming z-axis scan.

The three dimensional structure may be very complex, and it may emit radiation patterns that are highly complex, and are hard to analyze.

There is a growing need to provide a fast and accurate inspection process that may also provide explainable inspection results.

SUMMARY

There may be provided a method, a non-transitory computer readable medium, and a system as illustrated in the specification.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
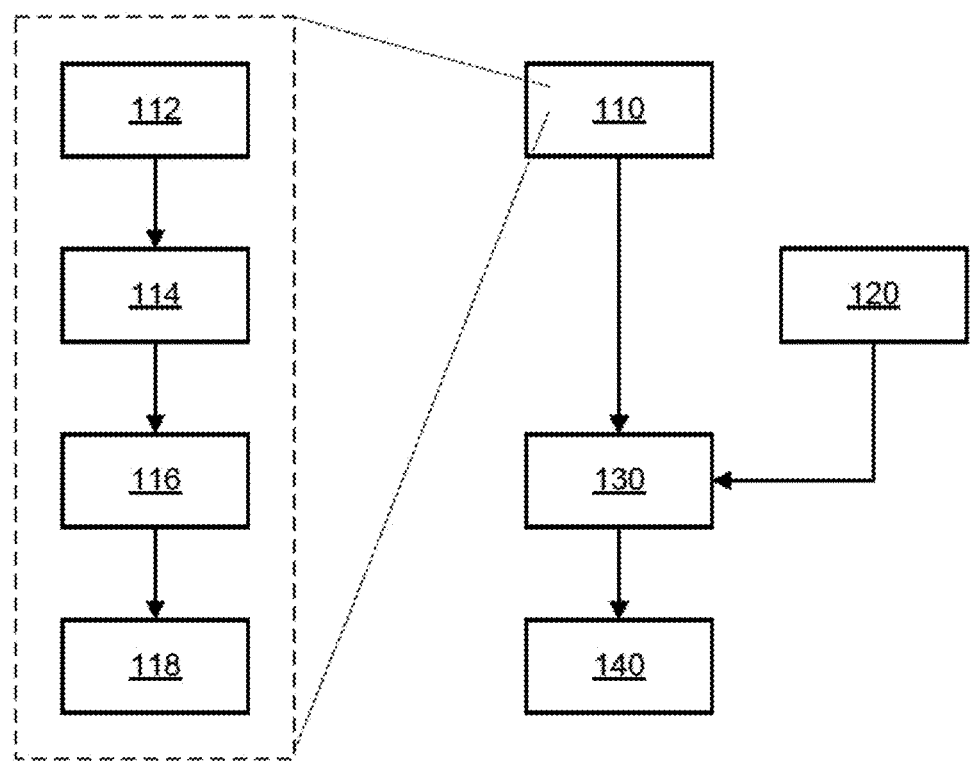
FIG. 1 illustrates an example of a method.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

The term "microscopic scale" means that at least one dimension is between a few tens of nanometers to a few tens of microns. A few may mean, for example, one to ten.

There may be provided a method, a system, and a non-transitory computer readable medium for providing explainable inspection results.

The inspection is fast as it does not require to perform z-axis scanning.

The inspection of explainable as it concentrates on difference images.

FIG. 1 illustrates an example of method 100 for inspecting a three dimensional structure of a microscopic scale, the three dimensional structure belongs to a sample.

Method 100 may start by steps 110 and 120.

Step 110 may include obtaining an image of the three dimensional structure. The image of the three dimensional structure is referred to as an "image".

Step 120 may include obtaining a reference image of a reference three dimensional structure. The reference image of the reference three dimensional structure is referred to as a "reference image".

The reference image may be obtained at the same manner as the image. Alternatively—the reference image and the image may be obtained at different manners.

A reference three dimensional structure and a three dimensional structure are ideally identical to each other. Ideally identical means that at an absence of a defect the reference three dimensional structure substantially equals the three dimensional structure.

Substantially equals may be equal, or may be within an allowable deviation from being equal. The allowable deviation may be, for example, a deviation that does not alter the functionality of the three dimensional structure, a deviation of in shape of up to few percent, a deviation in size of up to a few percent, and the like.

The reference three dimensional structure and the three dimensional structure may belong to different dies. The method may include performing a die to die comparison.

The reference three dimensional structure and the three dimensional structure may belong to different repetitive cells. The method may include performing a cell to cell comparison.

The reference image may be generated based on multiple previously acquired images of ideally identical three dimensional structures, may be based on design data, and/or may be referred to as a golden image. The method may include performing an actual to golden image comparison.

Step 110 may include generating the image by an inspection system. This may include illuminating the three dimensional structure, detecting radiation emitted from the three dimensional structure—as a result of the illuminating, and processing detection signals that are indicative of the detected radiation. Emitted may include reflected and/or scattered.

Step 110 may include receiving the image from another unit or from another system—for example receiving the image from an inspection system. The same applies to step 120.

Step 110 may include step 112 of illuminating the three dimensional structure by an illumination path of the optics, step 114 of collecting radiation emitted from the three dimensional structure by a collection path of the optics, step 116 of generating detection signals indicative of the radiation, and step 118 of processing the detection signals to provide the image.

The phase mask may be located at the illumination path or in the collection path.

The phase mask may be located at an exit pupil of the collection path. In an aerial illumination system, the phase mask should be located at the collection path. In a scanning spot inspection system, the phase mask should be located at the illumination path.

Step 112 may include illuminating the three dimensional structure at any angle (for example oblique or normal angle) by an illumination path of the optics.

Step 120 may include generating the reference image. Alternatively, step 120 may include receiving the reference image from another unit or system.

The image and the reference image may be generated using optics that may include a phase mask. The phase mask virtually expands a depth of field of the optics by encoding depth information over a depth range that exceeds the depth of field.

A non-limiting example of such a phase mask is illustrated in US patent publication 2016/0301915 of Shechtman et al., which is incorporated herein by reference.

The phase mask, once positioned in an optical path, modifies a shape of radiation from an object or to the object. The shape modification characterizes the light as having two lobes with a lateral distance that changes along a line, having a first orientation, as a function of an axial proximity of the object to a focal plane, and with the line having a different orientation depending on whether the object is above or below the focal plane.

The depth range may exceed the depth of field by a factor of at least ten.

The reference image may be generated by simulating or otherwise calculating the reference image that should be generated using said phase mask.

The calculating may include simulating or otherwise calculating the reference image that should be generated based on design data such as computer aided design (CAD) data of the three dimensional structure.

Due to the complexity of the radiation patterns, the image and the reference image do not provide concrete or accurate enough information regarding defects.

Steps 110 and 120 may be followed by step 130 of generating a difference image that represents a difference between the image and the reference image Step 130 may include, for example, subtracting the image from the reference image, subtracting the reference image from the image, and the like.

Step 130 may be followed by step 140 of determining, based on the difference image, whether there is at least one defect (or at least one suspected defect) in the three dimensional structure. Any reference to a defect should be applied mutatis mutandis to a suspected defect. A suspected defect may be further verified and/or reviewed to determine if the suspected defect is a real defect or not.

Each defect is represented in the difference image as a set of pixels that are indicative of at least a certain amount of difference. The certain amount may be determined as at least a certain value of pixel intensity, certain amount of gray level of the difference image, or any other criterion.

When determining that there is the at least one defect then step 140 includes providing a depth of the at least one defect. The depth means the location, along the Z-axis, of the defect.

The depth is provided because the difference image includes depth information.

The three dimensional structure may include structural elements that are located at different depths.

Step 140 may indicate which structural element is defective.

The three dimensional structure may be a three dimensional NAND memory. The structural elements may be different layers of the three dimensional NAND memory. The depth information may indicate which layer is defective.

Figure 2:
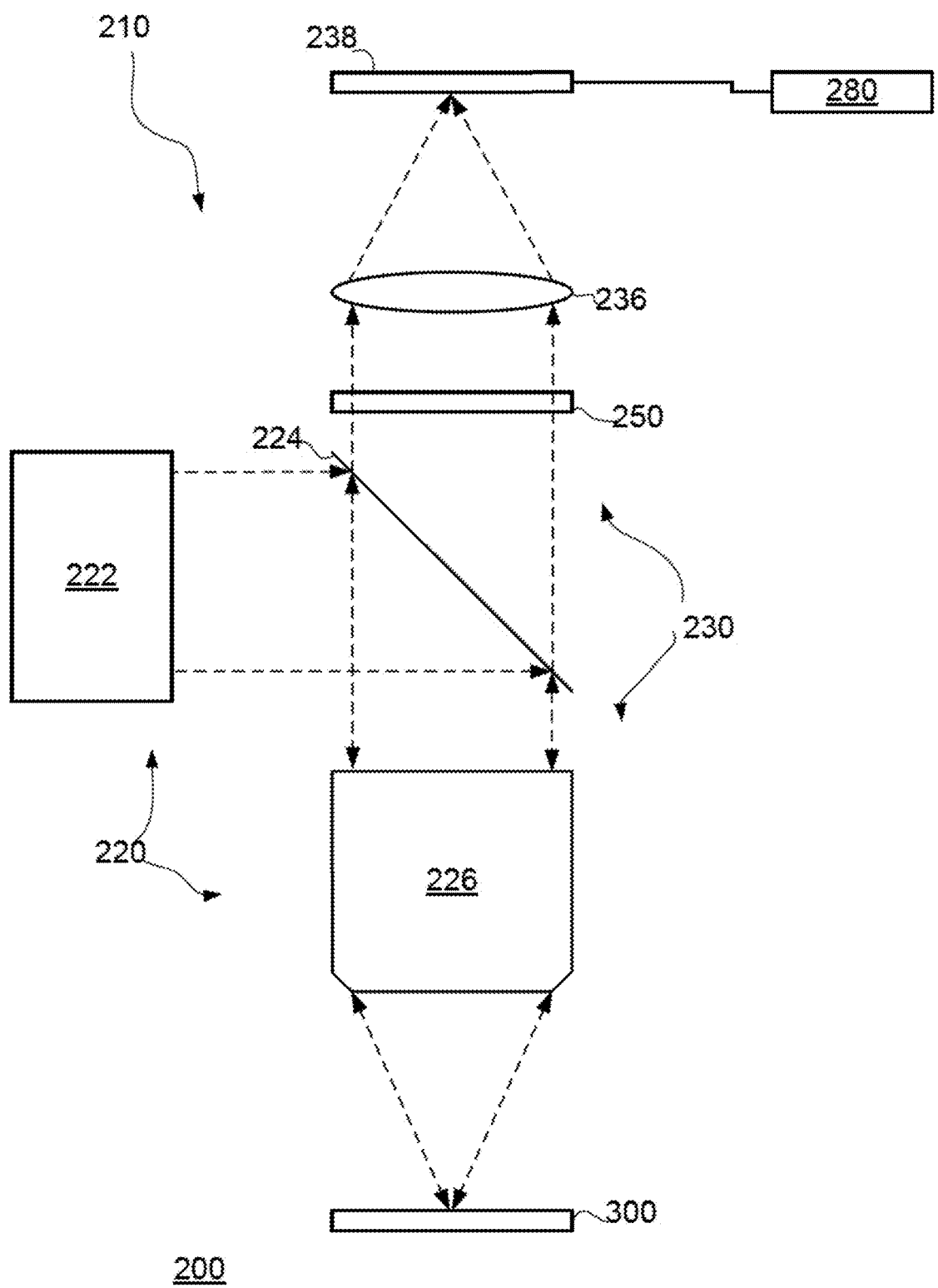
FIG. 2 illustrates an example of an inspection system.

FIG. 2 illustrates an inspection system 200, and a sample 300. Sample 300 is inspected by the inspection system 200.

Inspection system 200 includes optics 210, and a processing circuitry 280. It should be noted that at least some of the functions of the processing circuitry 280 may be executed by a processing circuitry located outside an inspection system.

The optics 210 include an illumination path 220 and a collection path 230.

In FIG. 2, the phase mask is located at the collection path 230. It should be noted that the phase mask may be located at the illumination optics (See, for example, FIG. 3).

In an aerial illumination system it should be located at the collection path, while for a scanning spot it should be located at the illumination path.

In FIG. 2, the illumination path and the collection path share some optical components. It should be noted that the illumination path may not share any optical component with the collection path.

Processing circuitry 280 is configured to (a) receive an image of the three dimensional structure, (b) receive a reference image of a reference three dimensional structure, the reference three dimensional structure and the three dimensional structure are ideally identical to each other, (c) generate a difference image that represents a difference between the image and the reference image; and (d) and determine, based on the difference image, whether there is at least one defect in the three dimensional structure. When determining that there is the at least one defect then providing a depth of the at least one defect.

The image and the reference image may be generated using optics 210. Optics 210, and especially, collection path 230, may include phase mask 250.

Phase mask 250 virtually expands a depth of field of the optics by encoding depth information over a depth range that exceeds the depth of field.

A non-limiting example of such a phase mask is illustrated in US patent publication 2016/0301915 of Shechtman et al. which is incorporated herein by reference. The phase mask once positioned in an optical path may modify a shape of light from an object or to an object.

The shape modification characterizes the light as having two lobes with a lateral distance that changes along a line, having a first orientation, as a function of an axial proximity of the object to a focal plane, and with the line having a different orientation depending on whether the object is above or below the focal plane.

In FIG. 2, the phase mask 250 is illustrates as a transmissive phase mask—in which radiation passes through the phase mask—but the phase mask may be a reflective phase mask—that reflects the radiation.

In FIG. 2, the illumination path 220 includes light source 222, beam splitter 224 and objective lens 226. The collection path 230 includes objective lens 226, beam splitter 224, phase mask 250, tube lens 236 and sensor 238.

Figure 3:
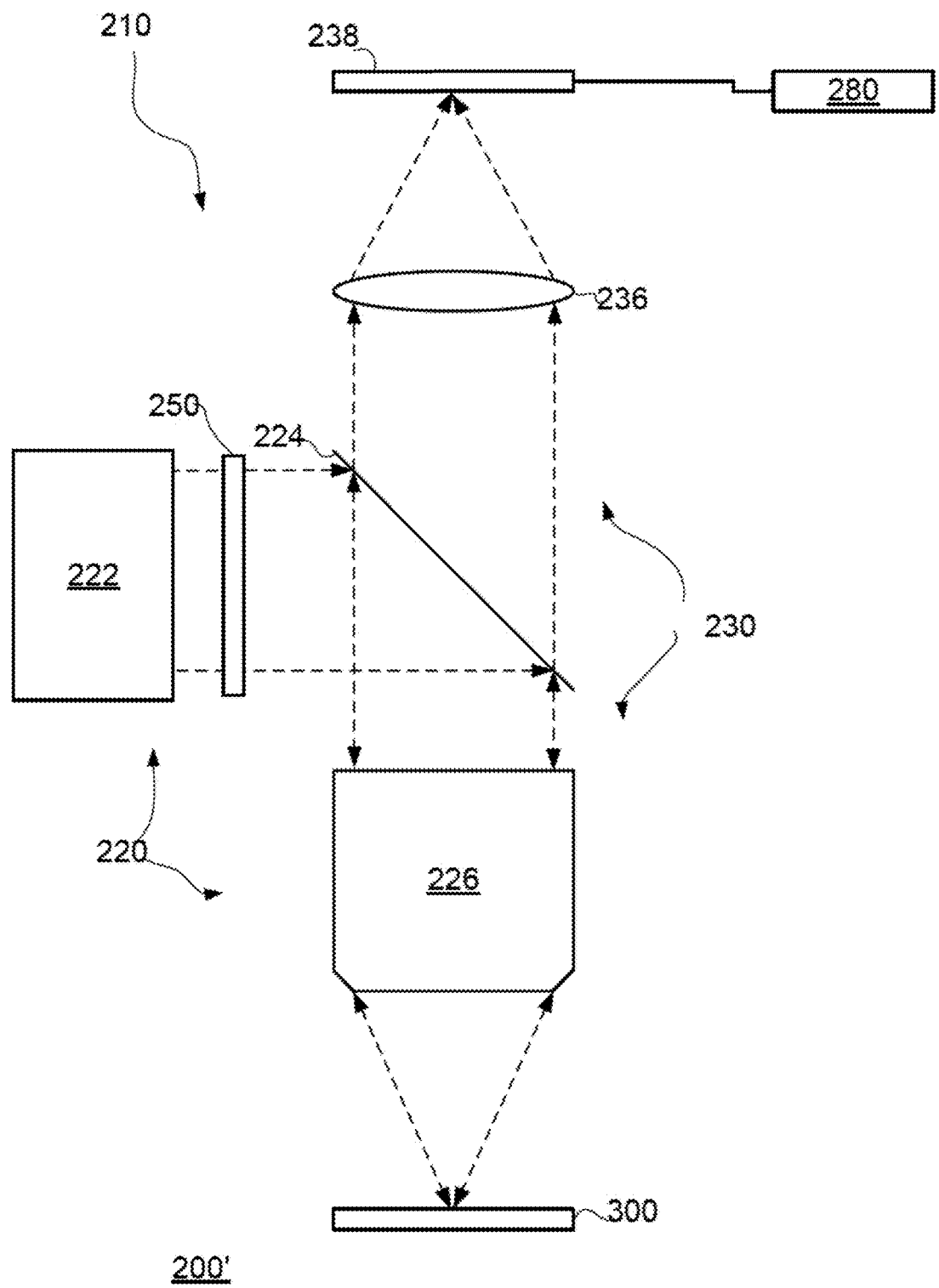
FIG. 3 illustrates an example of an inspection system.

FIG. 3 illustrates an inspection system 200', and sample 300. Sample 300 is inspected by inspection system 200'.

Inspection system 200 of FIG. 2 and inspection system 200' 3 may differ from each other by the location of the phase mask 250. In FIG. 3, the phase mask 250 is located at the illumination optics—before the beam splitter.

Figure 4:
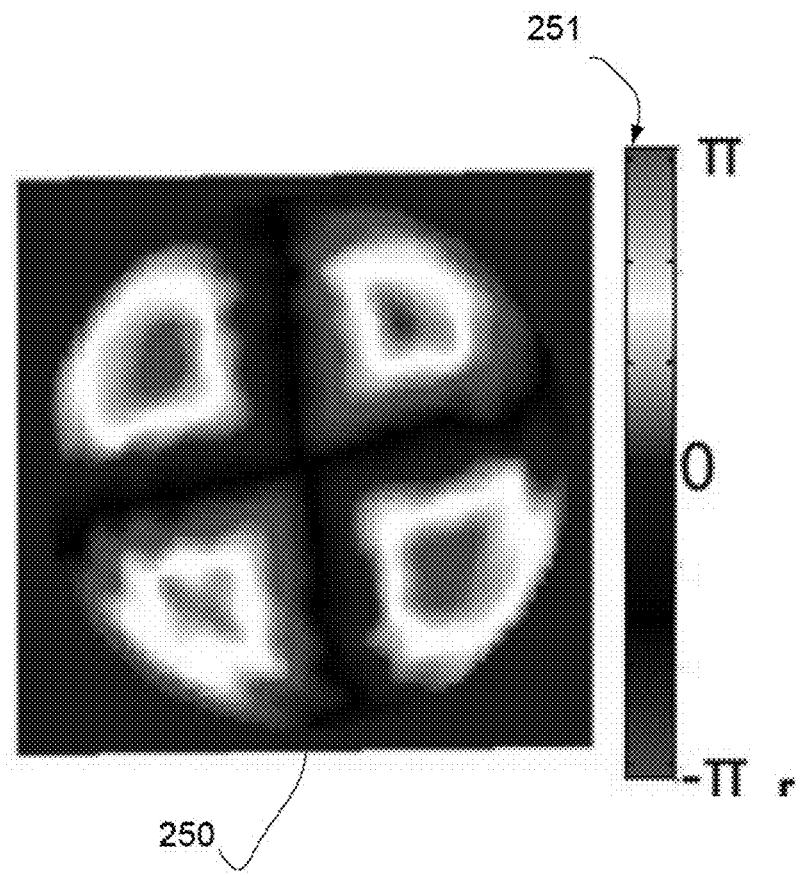
FIG. 4 illustrates an example of a phase mask and of a differential image.
Figure 4:
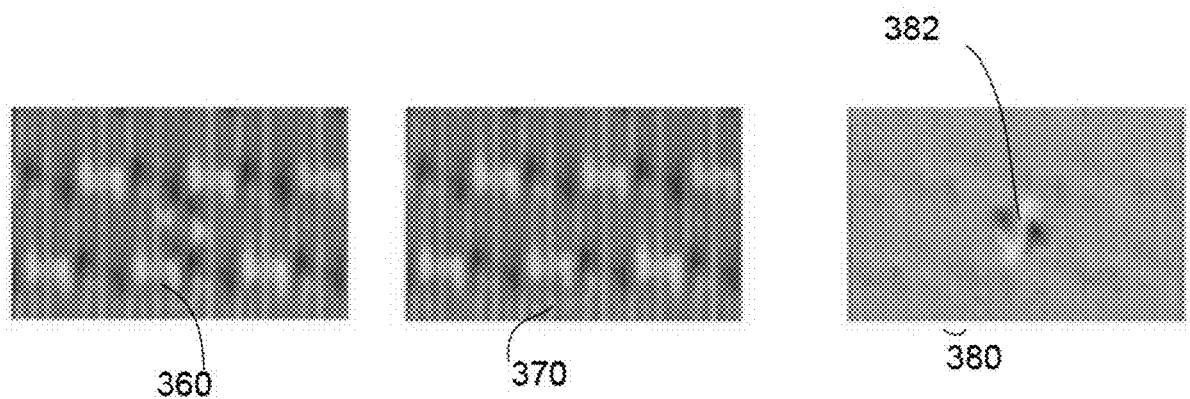

FIG. 4 illustrates an example of a phase mask 250, a first image 360, a second image 370, and a difference image 380.

Element 251 maps phase difference between plus pi to minus pi to shades of pixels of the phase mask 250.

The difference image 380 includes a set of pixels 382 that represent a significant difference between the first image 360 and the second image 370. The significant difference may be indicative of a suspected defect. The set of pixels 382 is indicative of the location (in z-axis) of the suspected defect.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for inspecting a three dimensional structure of a microscopic scale of a sample, the method comprises:
   obtaining an image of the three dimensional structure;
   obtaining a reference image of a reference three dimensional structure, the reference three dimensional structure and the three dimensional structure are ideally identical to each other;
   wherein each one of the image and the reference image was generated using optics that comprises a phase mask, wherein the phase mask virtually expands a depth of field of the optics by encoding depth information over a depth range that exceeds the depth of field;
   generating a difference image that represents a difference between the image and the reference image; and
   determining, based on the difference image, whether there is at least one defect in the three dimensional structure; wherein when determining that there is the at least one defect then providing a depth of the at least one defect.

2. The method according to claim 1 wherein the depth range exceed the depth of field by a factor of at least ten.

3. The method according to claim 1 wherein the three dimensional structure comprises structural elements that are located at different depths and wherein the depth of the at least one defect determine which structural element is defective.

4. The method according to claim 3 wherein the three dimensional structure is a three dimensional NAND memory and wherein the structural elements are different layers of the three dimensional NAND memory.

5. The method according to claim 1 wherein the obtaining of the image comprises illuminating the three dimensional structure by an illumination path of the optics, and collecting radiation emitted from the three dimensional structure by a collection path of the optics; wherein the phase mask is located at the illumination path.

6. The method according to claim 1 wherein the obtaining of the image comprises illuminating the three dimensional structure by an illumination path of the optics, and collecting radiation emitted from the three dimensional structure by a collection path of the optics; wherein the phase mask is located at the collection path.

7. The method according to claim 6 wherein the phase mask is located at an exit pupil of the collection path.

8. A system for inspecting a three dimensional structure of a microscopic scale of a sample, the system comprises:
   a processing circuitry that is configured to:
   receive an image of the three dimensional structure;
   receive a reference image of a reference three dimensional structure, the reference three dimensional structure and the three dimensional structure are ideally identical to each other;
   wherein each one of the image and the reference image was generated using optics that comprises a phase mask, wherein the phase mask virtually expands a depth of field of the optics by encoding depth information over a depth range that exceeds the depth of field;
   generate a difference image that represents a difference between the image and the reference image; and
   determine, based on the difference image, whether there is at least one defect in the three dimensional structure; wherein when determining that there is the at least one defect then providing a depth of the at least one defect.

9. The system according to claim 8 wherein the processing circuitry belongs to an inspection system, the inspection system comprises optics for generating the image.

10. The system according to claim 8 wherein the system is configured to obtain the image by illuminating the three dimensional structure by an illumination path of an optics, and collecting radiation emitted from the three dimensional structure by a collection path of the optics; wherein the phase mask is located at the illumination path.

11. The system according to claim 8 wherein the system is configured to obtain the image by illuminating the three dimensional structure by an illumination path of an optics, and collecting radiation emitted from the three dimensional structure by a collection path of the optics; wherein the phase mask is located at the collection path.

12. The system according to claim 11 wherein the phase mask is located at an exit pupil of the collection path.

13. A non-transitory computer readable medium that stores instructions for:
   obtaining an image of a three dimensional structure, the three dimensional structure is of a microscopic scale of a sample;
   obtaining a reference image of a reference three dimensional structure, the reference three dimensional structure and the three dimensional structure are ideally identical to each other;
   wherein each one of the image and the reference image was generated using optics that comprises a phase mask, wherein the phase mask virtually expands a depth of field of the optics by encoding depth information over a depth range that exceeds the depth of field;
   generating a difference image that represents a difference between the image and the reference image;
   determining, based on the difference image, whether there is at least one defect in the three dimensional structure; wherein when determining that there is the at least one defect then providing a depth of the at least one defect.

14. The non-transitory computer readable medium according to claim 13 wherein the depth range exceed the depth of field by a factor of at least ten.

15. The non-transitory computer readable medium according to claim 13 wherein the three dimensional structure comprises structural elements that are located at different depths and wherein the depth of the at least one defect determine which structural element is defective.

16. The non-transitory computer readable medium according to claim 15 wherein the three dimensional structure is a three dimensional NAND memory and wherein the structural elements are different layers of the three dimensional NAND memory.

* * * * *